(No Model.)
E. SMITH.
SAW TOOTH.
No. 289,576. Patented Dec. 4, 1883.
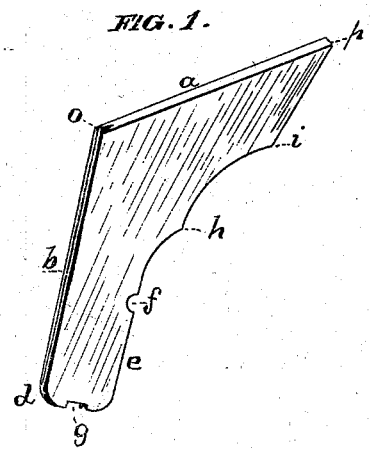
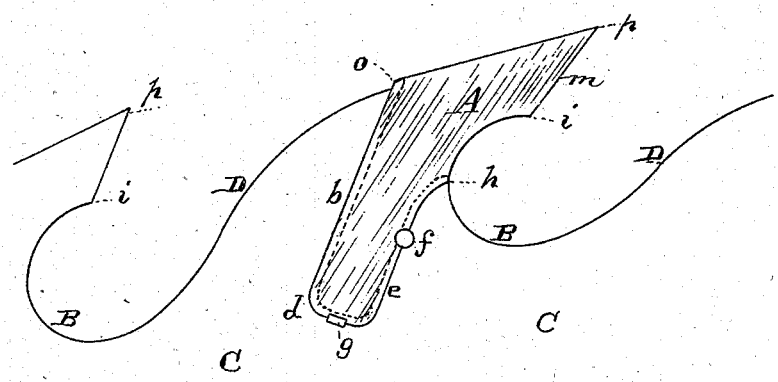
Witnesses
Geo. H. Strong.
Inventor,
Eugene Smith
By Dewey & Co.
Attorneys

UNITED STATES PATENT OFFICE.

EUGENE SMITH, OF SAN FRANCISCO, CALIFORNIA.

SAW-TOOTH.

SPECIFICATION forming part of Letters Patent No. 289,576, dated December 4, 1883.

Application filed September 14, 1883. (No model.)

*To all whom it may concern:*

Be it known that I, EUGENE SMITH, of the city and county of San Francisco, and State of California, have invented an Improvement in Insertible Saw-Teeth; and I hereby declare the following to be a full, clear, and exact description thereof.

My invention relates to certain improvements in insertible teeth for saws; and it consists of a peculiarly-shaped tooth and its combination with and insertion into the saw-plate in such a manner as to bring the strain, when at work, in the direction of the length of the tooth, to provide a strong support for the teeth and a perfect clearance while enabling the teeth to be placed more closely together, and to allow the teeth to be sharpened until worn out without altering their angle, all of which will be more fully explained by reference to the accompanying drawings, in which—

Figure 1 is a side view of a tooth. Fig. 2 is a view of a section of a saw-plate with my teeth inserted.

A is a tooth formed after my plan. *a* is the top, and *b* is the back. These unite at an angle of about one hundred and thirty degrees, which I have found by experiment gives the best results in reducing the strain upon the saw-plate and upon the tooth itself. The lower end of the shank is rounded, as shown at *d*, and the front *e* is parallel with the back. Both front and back are channeled or grooved to fit corresponding tongues upon the slot in the saw-blade, and the shank is held in place by a pin, *f*, which lies half in the saw-plate and half in the tooth. A small notch, *g*, is made in the lower end of the shank of the tooth for the insertion of a tool, by which it can be driven out after the pin *f* is removed. The front portion of the shank of the tooth is curved outward to the point or angle *h*, where it meets the angle of the throat B of the saw-blade. From this point the tooth curves outward to the point *i*, thus forming a concave, which is a continuation of the curve or sweep of the throat B. From the point *i* the front of the tooth forms a nearly or quite straight line, *m*, with the cutting-point at *p*. The saw blade or plate C has the throat B, through which a clearance for the sawdust is effected, formed in a curve, the sweep of which commences at the angle *i* of the tooth and forms a continuation of the concave portion of the tooth embraced between the points *h* and *i*, until somewhat more than a semicircle is completed, when it unites with a reverse convex curve, D, which forms the back of the tooth in front of it. This curved back D is preferably in the form of the arc of a circle, the center of which will in the case of each tooth be at one side of the center of the saw-plate, and its upper angle, *o*, just meets the obtuse angle formed by the top and back of the tooth, as before described, the top of the tooth being nearly or quite tangent with the circle or curve D. By this construction the lifting-strain which is brought upon the point of the tooth in cutting is directed very nearly in the line of its greatest length, owing to the angle at which the top meets the back, and the pressure is principally upon the bottom of the shank, while the curved portion D of the saw-plate gives the strongest possible form of support for the back of the tooth. This enables me to place the teeth very closely together, and to increase the number used in a saw. The front of the tooth extends forward from the angle *i*, and meets the top line, *a*, so as to form the cutting-point *p*. The concave curve of the tooth from *h* to *i* throws the front line, *i p*, forward so far that it may be ground or filed away from time to time in the same plane, thus maintaining the angle or point *p* of the tooth without change until the whole tooth-face is brought back to a line with the angle *h*, when a new tooth may be substituted.

Having thus described my invention, what I claim as new, and desire to secure by Letters Patent, is—

1. In a saw, the independent tooth consisting of a shank with the parallel grooved front and back fitted to corresponding tongues in the slotted saw-plate, the top of the tooth meeting the back at an obtuse angle greater than one hundred and twenty degrees, and the front or cutting portion forming an acute angle with the top, and united with the shank by concave curves *f h i*, substantially as herein described.

2. In a saw, the independent tooth consisting of a shank with the parallel grooved front and back fitted to a slotted saw-plate, the top of the tooth meeting the back at an obtuse angle, and the point formed by the front meeting the top at an acute angle, as shown, in combination with the receding concave curve *h i*, whereby the angle of the tooth may be preserved in sharpening, substantially as herein described.

3. In a saw, the independent tooth consisting of a shank with the parallel grooved front and back, the top meeting the back at an obtuse angle, and the point formed by the front meeting the top at an acute angle, and the concave curve receding from the lower angle of the front, in combination with a saw-plate slotted to receive the shank, and having the throat curved, so as to form a continuation of the curve *h i* of the tooth, substantially as herein described.

4. In a saw, the independent tooth consisting of a shank with parallel grooved front and back, the top meeting the back at an obtuse angle, and the point formed by the front meeting the top at an acute angle, said front uniting with the shank by a concave receding curve or curves, as shown, in combination with a saw-plate slotted to receive the shank of the tooth, a throat, B, forming a curve continuous with the curve *h i* of the tooth, and a reverse curve, D, forming a continuation of the curve B to the rear upper angle of the tooth, so that the top of the tooth forms a tangent with the curve, substantially as herein described.

In witness whereof I have hereunto set my hand.

EUGENE SMITH.

Witnesses:
S. H. NOURSE,
H. C. LEE.